(12) United States Patent
Sato et al.

(10) Patent No.: US 9,154,000 B2
(45) Date of Patent: Oct. 6, 2015

(54) UNINTERRUPTIBLE POWER SUPPLY APPARATUS INCLUDING A CONTROL CIRCUIT THAT EXECUTES A FIRST MODE WHEN SUPPLY OF A FIRST AC ELECTRIC POWER FROM A COMMERCIAL AC POWER SUPPLY IS RESUMED AT A TIME OF DISCHARGE END

(75) Inventors: Eduardo Kazuhide Sato, Tokyo (JP);
Masahiro Kinoshita, Tokyo (JP);
Yushin Yamamoto, Tokyo (JP);
Tatsuaki Amboh, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 751 days.

(21) Appl. No.: 13/498,009

(22) PCT Filed: Sep. 25, 2009

(86) PCT No.: PCT/JP2009/066643
§ 371 (c)(1),
(2), (4) Date: Apr. 25, 2012

(87) PCT Pub. No.: WO2011/036767
PCT Pub. Date: Mar. 31, 2011

(65) Prior Publication Data
US 2012/0217809 A1 Aug. 30, 2012

(51) Int. Cl.
*H02J 9/00* (2006.01)
*H02J 9/06* (2006.01)

(52) U.S. Cl.
CPC .................................... *H02J 9/062* (2013.01)

(58) Field of Classification Search
CPC ........................................................ H02J 9/062
USPC .............................. 307/44–46, 64–66, 85–87
See application file for complete search history.

(56) References Cited

U.S. PATENT DOCUMENTS

| 6,201,371 B1 | 3/2001 | Kawabe et al. | |
| 7,456,518 B2 * | 11/2008 | Hjort et al. | 307/64 |
| 2011/0049991 A1 * | 3/2011 | Sato et al. | 307/48 |

(Continued)

FOREIGN PATENT DOCUMENTS

| CN | 1273705 A | 11/2000 |
| JP | 62 012338 | 1/1987 |

(Continued)

OTHER PUBLICATIONS

Notice of Allowance issued on Feb. 12, 2014, in Japanese Patent Application No. 2011-532845 with English translation.

(Continued)

*Primary Examiner* — Jared Fureman
*Assistant Examiner* — Brett Squires
(74) *Attorney, Agent, or Firm* — Oblon, McClelland, Maier & Neustadt, L.L.P.

(57) ABSTRACT

In this uninterruptible power supply apparatus, even after electric power supply to a load stops due to prolonged power failure time, the operation of an inverter is continued, a DC power supply voltage is generated based on an output of the inverter, and a control circuit is driven by the DC power supply voltage. Therefore, when electric power supply from a commercial AC power supply is resumed during the stop of electric power supply to the load, electric power supply to the load is automatically resumed by the control circuit.

6 Claims, 6 Drawing Sheets

(56) References Cited

U.S. PATENT DOCUMENTS

| | | |
|---|---|---|
| 2011/0103106 A1 | 5/2011 | Sato et al. |
| 2011/0127837 A1 | 6/2011 | Sato et al. |
| 2011/0134672 A1 | 6/2011 | Sato et al. |
| 2011/0170322 A1 | 7/2011 | Sato et al. |
| 2011/0299307 A1 | 12/2011 | Sato et al. |
| 2012/0013193 A1 | 1/2012 | Sato et al. |

FOREIGN PATENT DOCUMENTS

| | | |
|---|---|---|
| JP | 2 280540 | 11/1990 |
| JP | 8-154349 A | 6/1996 |
| JP | 2001 061238 | 3/2001 |
| JP | 2008 295228 | 12/2008 |
| JP | 2009-11081 A | 1/2009 |
| JP | 2009 124836 | 6/2009 |
| KR | 10-1999-0078319 A | 10/1999 |
| KR | 10-2003-0094496 A | 12/2003 |

OTHER PUBLICATIONS

Office Action issued Feb. 25, 2013 in Korean Patent Application No. 10-2012-7009829 (with English-language translation).

International Search Report issued on Dec. 8, 2009 in PCT/JP09/66643 filed on Sep. 25, 2009.

Combined Chinese Office Action and Search Report issued Nov. 5, 2013, in Patent Application No. 200980161681.7.

U.S. Appl. No. 13/395,248, filed Mar. 9, 2012, Sato, et al.

U.S. Appl. No. 13/498,515, filed Mar. 27, 2012, Sato, et al.

\* cited by examiner

UNINTERRUPTIBLE POWER SUPPLY APPARATUS INCLUDING A CONTROL CIRCUIT THAT EXECUTES A FIRST MODE WHEN SUPPLY OF A FIRST AC ELECTRIC POWER FROM A COMMERCIAL AC POWER SUPPLY IS RESUMED AT A TIME OF DISCHARGE END

TECHNICAL FIELD

The present invention relates to an uninterruptible power supply apparatus, and particularly to an uninterruptible power supply apparatus that allows electric power supply to a load even at the time of power failure.

BACKGROUND ART

Conventionally, an uninterruptible power supply apparatus has been widely used as a power supply apparatus for stably supplying AC electric power to an important load such as a computer system. As described in Japanese Patent Laying-Open No. 2001-61238 (PTL 1), for example, the uninterruptible power supply apparatus generally includes a converter converting first AC electric power from a commercial AC power supply to DC electric power, a power storage device storing the DC electric power, and an inverter converting the DC electric power supplied from the converter or the power storage device to second AC electric power having a commercial frequency and supplying the second AC electric power to a load.

In a normal state in which the first AC electric power is supplied from the commercial AC power supply, the converter converts the first AC electric power to the DC electric power, and supplies the DC electric power to the inverter while charging the power storage device. The inverter converts the DC electric power to the second AC electric power and supplies the second AC electric power to the load. When a power failure occurs at the commercial AC power supply, the DC electric power is supplied from the power storage device to the inverter and the inverter continues supplying the second AC electric power to the load.

CITATION LIST

Patent Literature

PTL 1: Japanese Patent Laying-Open No. 2001-61238

SUMMARY OF INVENTION

Technical Problem

In the conventional uninterruptible power supply apparatus, however, if an output voltage of the power storage device decreases to a discharge end voltage due to prolonged power failure time, the entire apparatus stops and electric power supply to the load stops. When electric power supply from the commercial AC power supply is resumed thereafter, the uninterruptible power supply apparatus must be manually activated. Therefore, the usability of the conventional uninterruptible power supply apparatus is not good.

Thus, a main object of the present invention is to provide an uninterruptible power supply apparatus automatically activated when electric power supply from the commercial AC power supply is resumed after power failure.

Solution to Problem

An uninterruptible power supply apparatus according to the present invention includes: a converter converting first AC electric power supplied from a commercial AC power supply to DC electric power; an inverter converting the DC electric power supplied from the converter or a power storage device to second AC electric power having a commercial frequency; a DC power supply generating a DC power supply voltage based on the second AC electric power; a first switch having one terminal receiving the first AC electric power and the other terminal connected to a load: a second switch having one terminal receiving the second AC electric power and the other terminal connected to the load; and a control circuit driven by the DC power supply voltage. The control circuit has: a first mode in which the first switch is brought out of conduction, the second switch is brought into conduction, and the converter and the inverter are operated to supply the second AC electric power to the load; a second mode in which the first switch is brought out of conduction, the second switch is brought into conduction, operation of the converter is stopped, and the inverter is operated to supply the second AC electric power to the load; a third mode in which the first and second switches are brought out of conduction to stop electric power supply to the load, and the operation of the converter is stopped and the inverter is operated to supply the second AC electric power to the DC power supply; and a fourth mode in which the first switch is brought into conduction and the second switch is brought out of conduction to supply the first AC electric power to the load. The control circuit executes the first mode in a normal state in which the first AC electric power is supplied from the commercial AC power supply, executes the second mode at the time of power failure in which supply of the first AC electric power from the commercial AC power supply is stopped, executes the third mode at the time of discharge end in which an output voltage of the power storage device decreases to a predetermined voltage during the power failure, and executes the fourth mode, and thereafter, executes the first mode when supply of the first AC electric power from the commercial AC power supply is resumed at the time of the discharge end.

Preferably, the control circuit further has a fifth mode in which the first and second switches are brought into conduction, and the converter and the inverter are operated to supply the first and second AC electric power to the load, and sequentially executes the fourth mode, the fifth mode and the first mode when supply of the first AC electric power from the commercial AC power supply is resumed at the time of the discharge end.

In addition, preferably, the uninterruptible power supply apparatus further includes a third switch having one terminal receiving the first AC electric power and the other terminal connected to an input node of the converter. The control circuit brings the third switch into conduction in the first mode, and brings the third switch out of conduction in the second and third modes.

In addition, preferably, the uninterruptible power supply apparatus further includes a chopper selectively performing any of a first operation for stepping down an output voltage of the converter and providing the voltage to the power storage device, a second operation for stepping up the output voltage of the power storage device and providing the voltage to the inverter, and a third operation for causing a positive current to flow from the power storage device to the inverter. The control circuit causes the chopper to perform the first operation in the first mode, causes the chopper to perform the second operation in the second mode, and causes the chopper to perform the third operation in the third mode.

In addition, preferably, the chopper includes: a capacitor connected between a positive-side power supply node and a negative-side power supply node of the inverter; first and second switching elements serially connected between the positive-side power supply node and the negative-side power supply node of the inverter; first and second diodes connected in antiparallel with the first and second switching elements, respectively; a first inductor connected between an anode of the first diode and a positive electrode of the power storage device; a second inductor connected between an anode of the second diode and a negative electrode of the power storage device; and a third diode connected between the positive electrode of the power storage device and the positive-side power supply node of the inverter. In the first operation, the second switching element is fixed to a non-conduction state and the first switching element is brought into/out of conduction. In the second operation, the first switching element is fixed to the non-conduction state and the second switching element is brought into/out of conduction. In the third operation, the first and second switching elements are fixed to the non-conduction state.

In addition, preferably, the chopper includes: a first capacitor connected between a positive-side power supply node of the inverter and an intermediate node: a second capacitor connected between the intermediate node and a negative-side power supply node of the inverter; first and second switching elements serially connected between the positive-side power supply node of the inverter and the intermediate node; third and fourth switching elements serially connected between the intermediate node and the negative-side power supply node of the inverter; first to fourth diodes connected in antiparallel with the first to fourth switching elements, respectively: a first inductor connected between an anode of the first diode and a positive electrode of the power storage device; and a second inductor connected between an anode of the third diode and a negative electrode of the power storage device. In the first operation, the second and third switching elements are fixed to a non-conduction state, and the first and fourth switching elements are alternately brought into conduction. In the second operation, the first and fourth switching elements are fixed to the non-conduction state, and the second and third switching elements are alternately brought into conduction. In the third operation, the first to fourth switching elements are fixed to the non-conduction state.

Advantageous Effects of Invention

In the uninterruptible power supply apparatus according to the present invention, even after electric power supply to the load stops due to prolonged power failure time, the operation of the inverter is continued, the DC power supply voltage is generated based on an output of the inverter, and the control circuit is driven by the DC power supply voltage. Therefore, when electric power supply from the commercial AC power supply is resumed during the stop of electric power supply to the load, electric power supply to the load is automatically resumed by the control circuit.

DESCRIPTION OF EMBODIMENTS

Figure 1:
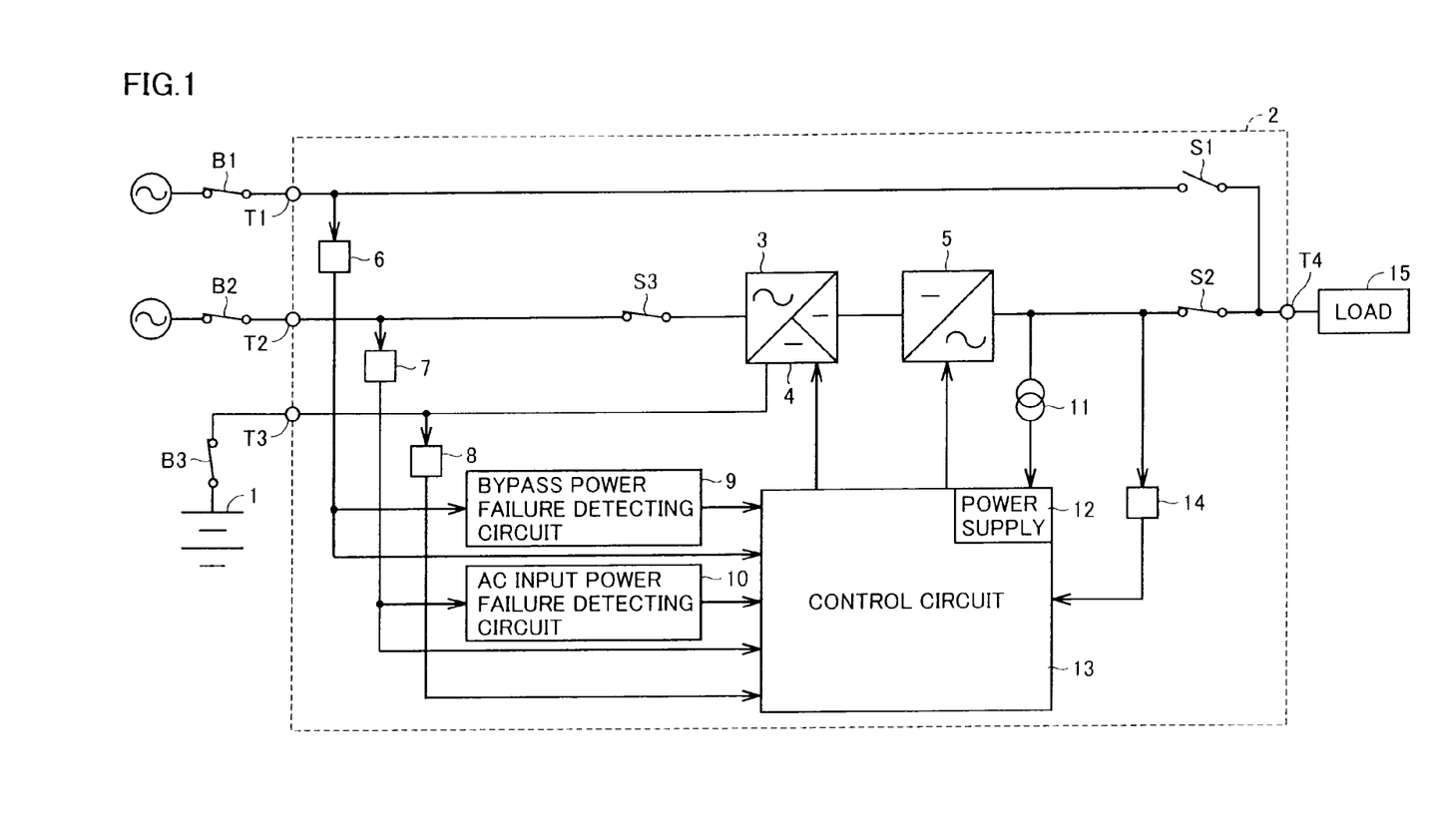
FIG. 1 is a circuit block diagram showing a configuration of an uninterruptible power supply system according to one embodiment of the present invention.

As shown in FIG. 1, an uninterruptible power supply system according to the present application includes breakers B1 to B3, a battery 1 and an uninterruptible power supply apparatus 2. Uninterruptible power supply apparatus 2 includes a bypass input terminal T1, an AC input terminal T2, a battery terminal T3, an output terminal T4, switches S1 to S3, a converter 3, a chopper 4, an inverter 5, voltage sensors 6 to 8 and 14, a bypass power failure detecting circuit 9, an AC input power failure detecting circuit 10, a transformer 11, a DC power supply 12, and a control circuit 13. Load 15 is connected to output terminal T4.

Breaker B1 has one terminal receiving AC electric power from a commercial AC power supply and the other terminal connected to bypass input terminal T1. Breaker B2 has one terminal receiving the AC electric power from the commercial AC power supply and the other terminal connected to AC input terminal T2. Breaker B3 has one terminal connected to a positive electrode of battery 1 and the other terminal connected to battery terminal T3. Here, breakers B1 to B3 are constantly ON.

Switches S1 to S3 are each controlled by control circuit 13. Switch S1 is connected between bypass input terminal T1 and output terminal T4, and is turned on in a bypass power feed mode and an overlap power feed mode. Switch S2 is connected between an output node of inverter 5 and output terminal T4, and is turned on in an inverter power feed mode and the overlap power feed mode. Switch S3 is connected between AC input terminal T2 and an input node of converter 3. Switch S3 is turned on in the normal state in which the AC electric power is supplied from the commercial AC power supply, and is turned off at the time of power failure in which supply of the AC electric power from the commercial AC power supply stops. FIG. 1 shows the state in which switches S2 and S3 are ON and switch S1 is OFF.

Figure 2:
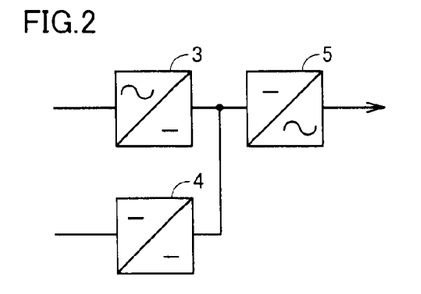
FIG. 2 is a block diagram showing a main portion of an uninterruptible power supply apparatus shown in FIG. 1.

Converter 3, chopper 4 and inverter 5 are each controlled by control circuit 13. Although converter 3 and chopper 4 are shown as one block in FIG. 1 for the sake of simplification of the figure, converter 3 and chopper 4 are separately provided as shown in FIG. 2. Returning to FIG. 1, switch S3, converter 3, inverter 5, and switch S2 are serially connected between AC input terminal T2 and output terminal T4. Converter 3 converts the AC electric power supplied from the commercial AC power supply through breaker B2, AC input terminal T2 and switch S3 to DC electric power.

Chopper 4 is connected between battery terminal T3 and an output node of converter 3 (i.e., an input node of inverter 5). In the normal state in which the AC electric power is supplied from the commercial AC power supply, chopper 4 steps down an output voltage of converter 3 and provides the voltage to battery 1. At the time of power failure in which supply of the AC electric power from the commercial AC power supply stops, chopper 4 steps up an output voltage of battery 1 and provides the voltage to inverter 5. When the output voltage of battery 1 decreases to a discharge end voltage during power failure, chopper 4 causes a positive current to flow from battery 1 through a diode to inverter 5.

Figure 3:
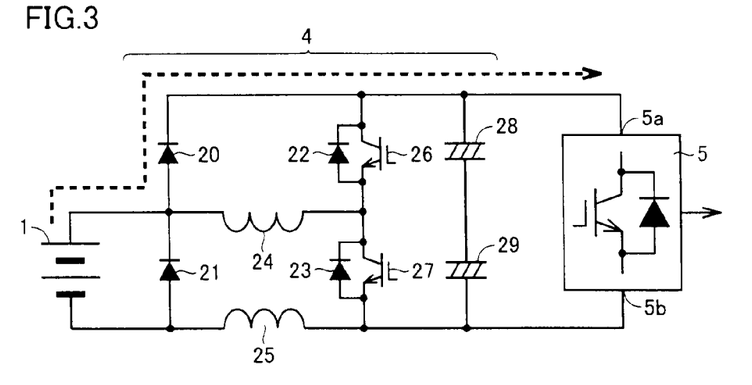
FIG. 3 is a circuit block diagram showing a configuration of a chopper shown in FIG. 2.

A detailed description will be given. As shown in FIG. 3, chopper 4 includes diodes 20 to 23, inductors 24 and 25, IGBTs (Insulated Gate Bipolar Transistors) 26 and 27, and capacitors 28 and 29. Capacitors 28 and 29 are serially connected between a positive-side power supply node 5a and a negative-side power supply node 5b of inverter 5. IGBTs 26 and 27 are serially connected between positive-side power supply node 5a and negative-side power supply node 5b of inverter 5. ON/OFF of IGBTs 26 and 27 are controlled by control circuit 13. Diodes 22 and 23 are connected in antiparallel with IGBTs 26 and 27, respectively. The positive electrode of battery 1 is connected to positive-side power supply node 5a of inverter 5 with diode 20 interposed therebetween, and is connected to a source of IGBT 26 with inductor 24 interposed therebetween. A negative electrode of battery 1 is connected to the positive electrode of battery 1 with diode 21 interposed therebetween, and is connected to negative-side power supply node 5b of inverter 5 with inductor 25 interposed therebetween.

Chopper 4 selectively performs any of a stepping-down operation, a stepping-up operation and a rectifying operation. In the rectifying operation, IGBTs 26 and 27 are fixed to the OFF state. As a result, as indicated by a dotted line in FIG. 3, a current flows from the positive electrode of battery 1 through diode 20, inverter 5 and inductor 25 to the negative electrode of battery 1, and DC electric power is supplied from battery 1 to inverter 5.

In the stepping-up operation, IGBT 26 is fixed to the OFF state and IGBT 27 is turned on/off. When IGBT 27 is turned on, a current flows from the positive electrode of battery 1 through inductor 24, IGBT 27 and inductor 25 to the negative electrode of battery 1, and electromagnetic energy is stored in inductors 24 and 25. When IGBT 27 is turned off, a current flows from the positive electrode of battery 1 through inductor 24, diode 22, inverter 5, and inductor 25 to the negative electrode of battery 1, and the electromagnetic energy in inductors 24 and 25 is released. At this time, a voltage higher than a voltage across terminals of battery 1 is applied between power supply nodes 5a and 5b of inverter 5.

In the stepping-down operation, IGBT 27 is fixed to the OFF state and IGBT 26 is turned on/off. Capacitors 28 and 29 are charged with the output voltage of converter 3. When IGBT 26 is turned on, a current flows from a positive electrode of capacitor 28 through IGBT 26, inductor 24, battery 1, and inductor 25 to a negative electrode of capacitor 29, and battery 1 is charged and electromagnetic energy is stored in inductors 24 and 25. When IGBT 26 is turned off, a current flows through inductor 24, battery 1, inductor 25, and diode 23, and battery 1 is charged and the electromagnetic energy in inductors 24 and 25 is released. At this time, a voltage lower than a voltage across terminals of capacitors 28 and 29 is applied between the terminals of battery 1.

In the normal state in which the AC electric power is supplied from the commercial AC power supply, control circuit 13 causes chopper 4 to perform the stepping-down operation. At the time of power failure in which supply of the AC electric power from the commercial AC power supply stops, control circuit 13 causes chopper 4 to perform the stepping-up operation. When the output voltage of battery 1 decreases to the discharge end voltage during power failure, control circuit 13 causes chopper 4 to perform the rectifying operation.

Returning to FIG. 1, in the normal state in which the AC electric power is supplied from the commercial AC power supply, inverter 5 converts the DC electric power generated by converter 3 to AC electric power having a commercial frequency. At the time of power failure, inverter 5 converts the DC electric power supplied from battery 1 through chopper 4 to AC electric power having a commercial frequency. The AC electric power generated by inverter 5 is supplied through switch S2 and output terminal T4 to load 15, and is supplied through transformer 11 to DC power supply 12.

Although not shown, input terminals T1 and T2 are each connected to DC power supply 12. In other words, an output voltage of transformer 11, a voltage of bypass input terminal T1 and a voltage of AC input terminal T2 are supplied to DC power supply 12 in parallel. DC power supply 12 generates a DC power supply voltage based on the AC electric power supplied through transformer 11 and input terminals T1 and T2. Control circuit 13 is driven by the DC power supply voltage generated by DC power supply 12, and controls the entire uninterruptible power supply apparatus.

Voltage sensor 6 detects a voltage of bypass input terminal T1 and provides a signal indicating the detection value to bypass power failure detecting circuit 9 and control circuit 13. Bypass power failure detecting circuit 9 determines whether or not a power failure has occurred, that is, whether or not supply of the AC electric power from the commercial AC power supply stops, based on the signal output from voltage sensor 6, and provides a signal indicating the determination result to control circuit 13.

Voltage sensor 7 detects a voltage of AC input terminal T2 and provides a signal indicating the detection value to AC input power failure detecting circuit 10 and control circuit 13. AC input power failure detecting circuit 10 determines whether or not a power failure has occurred, that is, whether or not supply of the AC electric power from the commercial AC power supply stops, based on the signal output from voltage sensor 7, and provides a signal indicating the determination result to control circuit 13.

Voltage sensor 8 detects the output voltage of battery 1 and provides a signal indicating the detection value to control circuit 13. Voltage sensor 14 detects an output voltage of inverter 5 and provides a signal indicating the detection value to control circuit 13. Control circuit 13 controls the entire uninterruptible power supply apparatus based on the signals output from voltage sensors 6 to 8 and 14, bypass power failure detecting circuit 9 and AC input power failure detecting circuit 10.

Figure 4:
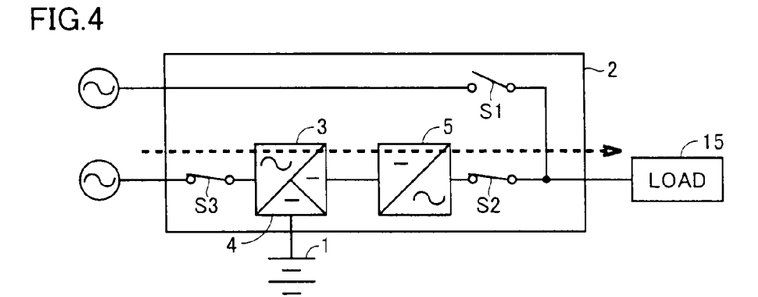
FIG. 4 is a circuit block diagram showing a converter/inverter power feed mode of a control circuit shown in FIG. 1.

In other words, control circuit 13 has a converter/inverter power feed mode, a battery/inverter power feed mode, a DC power supply backup mode, the bypass power feed mode, and an overlap operation mode. In the converter/inverter power feed mode, as shown in FIG. 4, control circuit 13 turns off switch S1 and turns on switches S2 and S3, causes converter 3 to operate to generate DC electric power, causes chopper 4 to perform the stepping-down operation to charge battery 1, and causes inverter 5 to operate to generate AC electric power, which is supplied to load 15.

At this time, control circuit 13 compares the input AC voltage detected by voltage sensors 6 and 7 with the output AC voltage detected by voltage sensor 14, and controls converter 3 and inverter 5 such that the input AC voltage matches the output AC voltage in terms of voltage value and phase.

Figure 5:
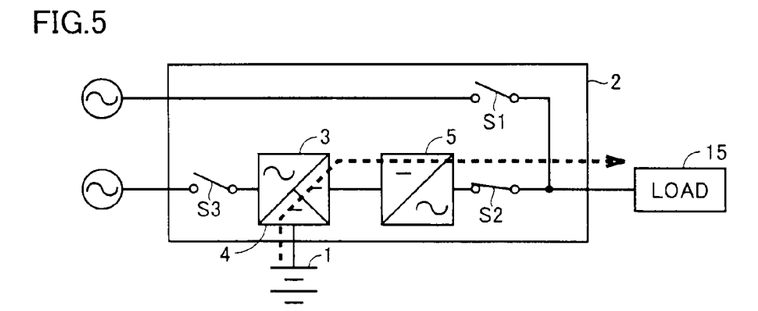
FIG. 5 is a circuit block diagram showing a battery/inverter power feed mode of the control circuit shown in FIG. 1.

In the battery/inverter power feed mode, as shown in FIG. 5, control circuit 13 turns off switches S1 and S3 and turns on switch S2, stops the operation of converter 3, causes chopper 4 to perform the stepping-up operation to supply DC electric power from battery 1 to inverter 5, and causes inverter 5 to operate to generate AC electric power, which is supplied to load 15.

Figure 6:
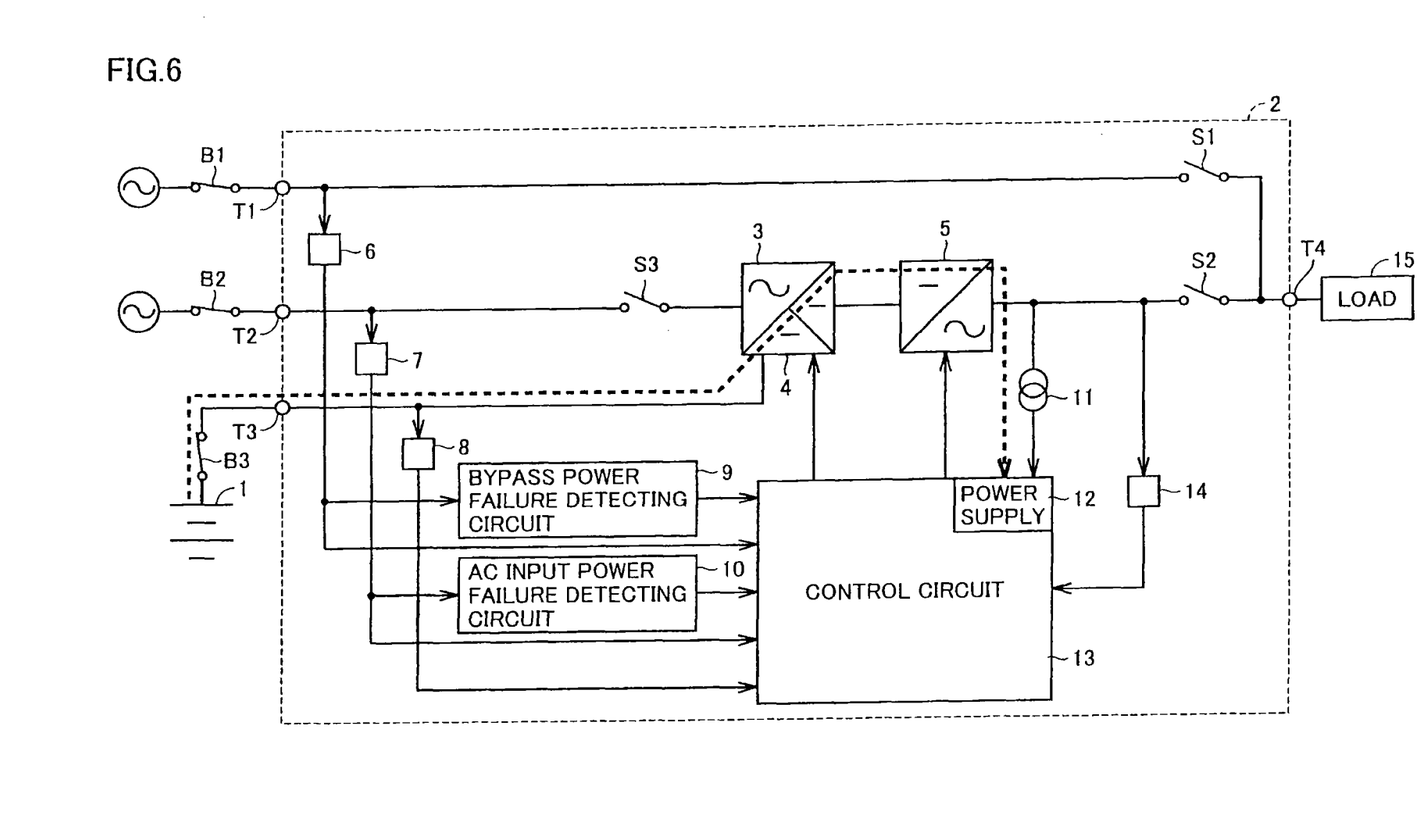
FIG. 6 is a circuit block diagram showing a DC power supply backup mode of the control circuit shown in FIG. 1.

In the DC power supply backup mode, as shown in FIG. 6, control circuit 13 turns off switches S1 to S3 to stop electric power supply to load 15, stops the operation of converter 3, causes chopper 4 to perform the rectifying operation to supply DC electric power from battery 1 to inverter 5, and causes inverter 5 to operate to generate AC electric power, which is supplied to DC power supply 12.

Figure 7:
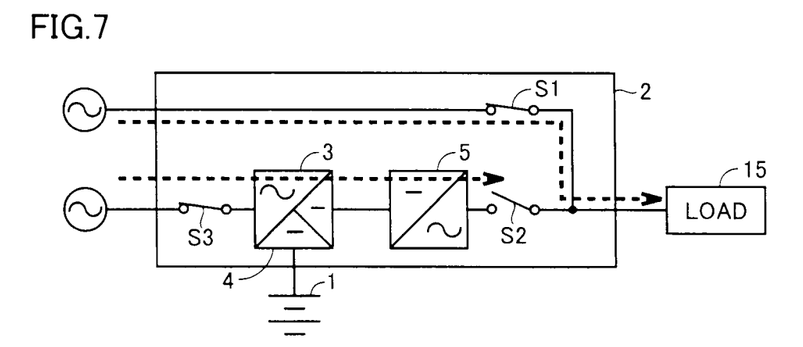
FIG. 7 is a circuit block diagram showing a bypass power feed mode of the control circuit shown in FIG. 1.

In the bypass power feed mode, as shown in FIG. 7, control circuit 13 turns on switches S1 and S3 and turns off switch S2 to directly supply the AC electric power from the commercial AC power supply to load 15, causes converter 3 to operate to generate DC electric power, causes chopper 4 to perform the stepping-down operation to charge battery 1, and causes inverter 5 to operate to generate AC electric power.

Figure 8:
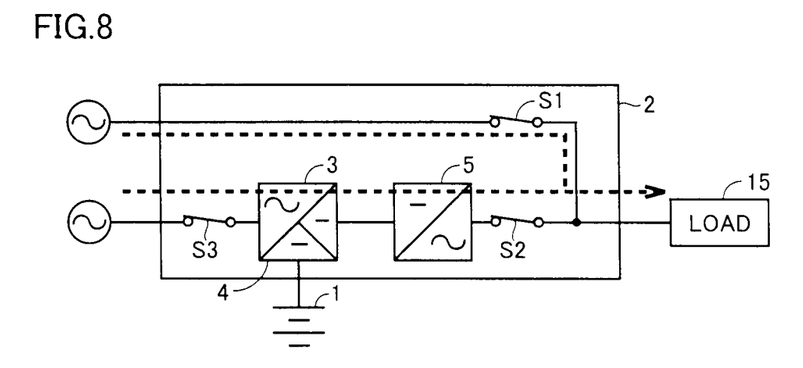
FIG. 8 is a circuit block diagram showing an overlap power feed mode of the control circuit shown in FIG. 1.

In the overlap operation mode, control circuit 13 executes the inverter power feed mode and the bypass power feed mode in parallel. Specifically, in the overlap operation mode, as shown in FIG. 8, control circuit 13 turns on switches S1 to S3 to directly supply the AC electric power from the commercial AC power supply to load 15, causes converter 3 to operate to generate DC electric power, causes chopper 4 to perform the stepping-down operation to charge battery 1, and causes inverter 5 to operate to generate AC electric power, which is supplied to load 15.

Control circuit 13 determines whether or not a power failure has occurred, based on the signals output from power failure detecting circuits 9 and 10, and determines whether or not the output voltage of battery 1 has decreased to the discharge end voltage, based on the signal output from voltage sensor 8. In the normal state in which there is no power failure, control circuit 13 executes the converter/inverter power feed mode shown in FIG. 4. When a power failure occurs, control circuit 13 first executes the battery/inverter power feed mode shown in FIG. 5, and when the output voltage of battery 1 decreases to the discharge end voltage, control circuit 13 executes the DC power supply backup mode shown in FIG. 6. When supply of the AC electric power from the commercial AC power supply is resumed during the DC power supply backup mode, control circuit 13 sequentially executes the bypass power feed mode shown in FIG. 7, the overlap operation mode shown in FIG. 8 and the converter/inverter power feed mode shown in FIG. 4.

Figure 9:
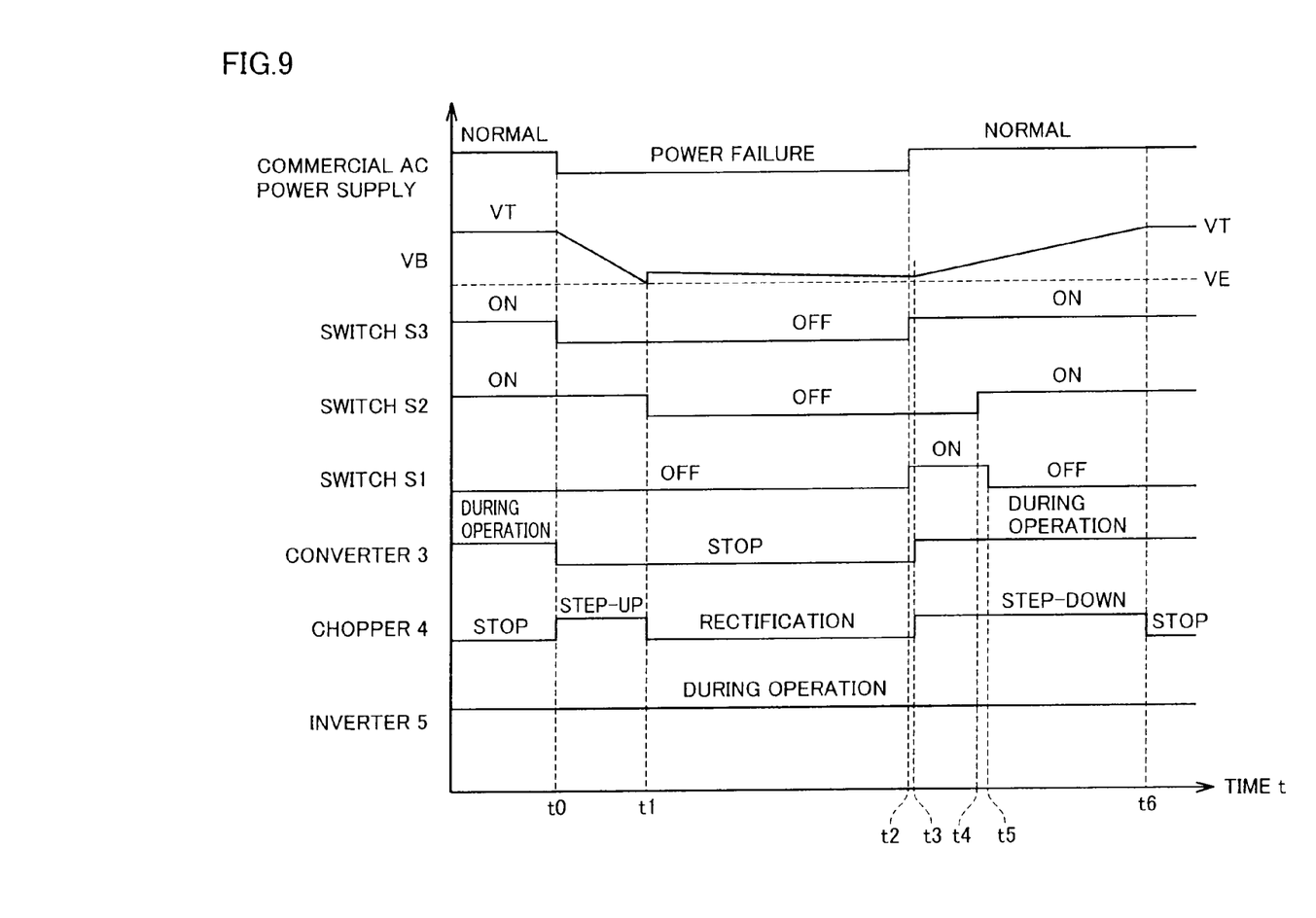
FIG. 9 is a time chart showing by way of example the operation of the uninterruptible power supply apparatus shown in FIG. 1.

FIG. 9 is a time chart showing by way of example the operation of uninterruptible power supply apparatus 2. In FIG. 9, the AC electric power is supplied normally from the commercial AC power supply in the initial state. In this case, control circuit 13 executes the converter/inverter power feed mode. As a result, as shown in FIG. 4, switch S1 is turned off and switches S2 and S3 are turned on, converter 3 is operated to generate DC electric power, and inverter 5 is operated to generate AC electric power, which is supplied to load 15. In FIG. 9, an output voltage VB of battery 1 is at a target voltage VT, and thus, chopper 4 is not operated. At this time, diode 20 in chopper 4 shown in FIG. 3 is in a reverse-biased state and a current does not flow through diode 20.

At time t0, a power failure occurs. Then, control circuit 13 executes the battery/inverter power feed mode. As a result, as shown in FIG. 5, switches S1 and S3 are turned off and switch S2 is turned on, the operation of converter 3 is stopped, chopper 4 performs the stepping-up operation to supply DC electric power from battery 1 to inverter 5, and inverter 5 is operated to generate AC electric power, which is supplied to load 15. When the DC electric power is supplied from battery 1 to inverter 5, output voltage VB of battery 1 decreases at a predetermined speed.

In this uninterruptible power supply system, during a time period from when a power failure occurs to when output voltage VB of battery 1 decreases to a discharge end voltage VE, the AC electric power can be supplied to load 15 and the operation of load 15 can be continued. If the power failure ends before output voltage VB of battery 1 decreases to discharge end voltage VE, the mode moves from the battery/inverter power feed mode to the converter/inverter power feed mode.

At time t1, output voltage VB of battery 1 decreases to discharge end voltage VE. Then, control circuit 13 executes the DC power supply backup mode. As a result, as shown in FIG. 6, switches S1 to S3 are turned off and electric power supply to load 15 is stopped. In addition, the operation of converter 3 is stopped, chopper 4 performs the rectifying operation to supply DC electric power from battery 1 to inverter 5, and inverter 5 is operated to generate AC electric power, which is supplied to DC power supply 12. Therefore, control circuit 13 continues operating even after the power failure. It is to be noted that output voltage VB of battery 1 increases slightly at time t1, because when electric power supply to load 15 is stopped, an output current of battery 1 decreases and a voltage drop caused by the internal resistance of battery 1 decreases.

At time t2, supply of the AC electric power from the commercial AC power supply is resumed. Then, control circuit 13 executes the bypass power feed mode. As a result, as shown in FIG. 7, switches S1 and S3 are turned on and switch S2 is turned off to directly supply the AC electric power from the commercial AC power supply to load 15. In addition, at time t3 immediately after time t2, the operation of converter 3 is resumed to generate DC electric power, chopper 4 performs the stepping-down operation to start charging of battery 1, and inverter 5 is operated to generate AC electric power.

At time t4, control circuit 13 executes the overlap operation mode. As a result, as shown in FIGS. 7 and 8, switch S2 is turned on in addition to the bypass power feed mode. At time t5, control circuit 13 executes the converter/inverter power feed mode. As a result, as shown in FIGS. 4 and 8, switch S1 that was ON in the overlap operation mode is turned off. At time t6, output voltage VB of battery 1 reaches target voltage VT. Then, chopper 4 is stopped and the operation returns to the initial state. If recovery from the power failure is not achieved and the output voltage of battery 1 decreases to an operation stop voltage lower than discharge end voltage VE, the operation of inverter 5 is also stopped and uninterruptible power supply apparatus 2 stops.

In the present embodiment, even after electric power supply to load 15 stops due to prolonged power failure time, the operation of inverter 5 is continued, an output of inverter 5 is supplied to DC power supply 12, and control circuit 13 is driven by DC power supply 12. Therefore, when electric power supply from the commercial AC power supply is resumed during a stop of electric power supply to load 15, uninterruptible power supply apparatus 2 is activated by control circuit 13 and electric power supply to load 15 is automatically resumed.

Figure 10:
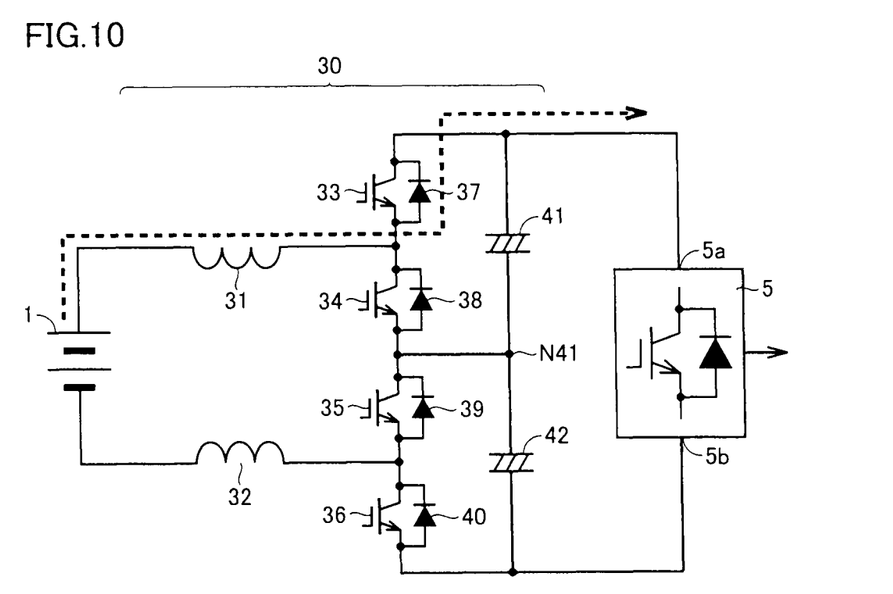
FIG. 10 is a circuit block diagram showing a modification of the embodiment.

FIG. 10 is a circuit diagram showing a modification of the present embodiment and compared with FIG. 3. In FIG. 10, chopper 4 is replaced by a chopper 30 in the present modification. Chopper 30 includes inductors 31 and 32, IGBTs 33 to 36, diodes 37 to 40, and capacitors 41 and 42. IGBTs 33 to 36 are serially connected between positive-side power supply node 5a and negative-side power supply node 5b of inverter 5.

Diodes 37 to 40 are connected in antiparallel with IGBTs 33 to 36, respectively. Inductor 31 is connected between the positive electrode of battery 1 and a source of IGBT 33. Inductor 32 is connected between the negative electrode of battery 1 and a source of IGBT 35. Capacitors 41 and 42 are serially connected between positive-side power supply node 5a and negative-side power supply node 5b of inverter 5. An intermediate node N41 between capacitors 41 and 42 is connected to a source of IGBT 34.

Chopper 30 selectively performs any of the stepping-down operation, the stepping-up operation and the rectifying operation. In the rectifying operation, IGBTs 33 to 36 are fixed to the OFF state. As a result, as indicated by a dotted line in FIG. 10, a current flows from the positive electrode of battery 1 through inductor 31, diode 37, inverter 5, diode 40, and inductor 32 to the negative electrode of battery 1, and DC electric power is supplied from battery 1 to inverter 5.

In the stepping-up operation, IGBTs 34 and 35 are alternately turned on. When IGBT 34 is turned on and IGBTs 33, 35 and 36 are turned off, a current flows from the positive electrode of battery 1 through inductor 31, IGBT 34, capacitor 42, diode 40, and inductor 32 to the negative electrode of battery 1, and capacitor 42 is charged. When IGBTs 33, 34 and 36 are turned off and IGBT 35 is turned on, a current flows from the positive electrode of battery 1 through inductor 31, diode 37, capacitor 41, IGBT 35, and inductor 32 to the negative electrode of battery 1, and capacitor 41 is charged. At this time, a voltage higher than a voltage across the terminals of battery 1 is applied between power supply nodes 5a and 5b of inverter 5.

In the stepping-down operation, IGBTs 33 and 36 are alternately turned on. When IGBT 33 is turned on and IGBTs 34 to 36 are turned off, a current flows from a positive electrode (node 5a) of capacitor 41 through IGBT 33, inductor 31, battery 1, inductor 32, and diode 39 to a negative electrode (node N41) of capacitor 41, and battery 1 is charged. When IGBT 36 is turned on and IGBTs 33 to 35 are turned off, a current flows from a positive electrode (node N41) of capacitor 42 through diode 38, inductor 31, battery 1, inductor 32, and IGBT 36 to a negative electrode (node 5b) of capacitor 42, and battery 1 is charged. At this time, a voltage lower than a voltage between the positive electrode of capacitor 41 and the negative electrode of capacitor 42 is applied across the terminals of battery 1. In the present modification as well, the same effects as those in the embodiment are obtained.

It should be understood that the embodiment disclosed herein is illustrative and not limitative in any respect. The scope of the present invention is defined by the terms of the claims, rather than the description above, and is intended to include any modifications within the scope and meaning equivalent to the terms of the claims.

REFERENCE SIGNS LIST

B1 to B3 breaker; T1 to T4 terminal; S1 to S3 switch; 1 battery; 2 uninterruptible power supply apparatus; 3 converter; 4, 30 chopper; 5 inverter; 6 to 8, 14 voltage sensor; 9 bypass power failure detecting circuit; 10 AC input power failure detecting circuit; 11 transformer; 12 DC power supply; 13 control circuit; 15 load; 20 to 23, 37 to 40 diode; 24, 25, 31, 32 inductor; 26, 27, 33 to 36 IGBT; 28, 29, 41, 42 capacitor

The invention claimed is:

1. An uninterruptible power supply apparatus, comprising:
a converter converting first AC electric power supplied from a commercial AC power supply to DC electric power;
an inverter converting the DC electric power supplied from said converter or a power storage device to second AC electric power having a commercial frequency;
a DC power supply generating a DC power supply voltage based on said second AC electric power;
a first switch having one terminal receiving said first AC electric power and the other terminal connected to a load;
a second switch having one terminal receiving said second AC electric power and the other terminal connected to said load; and
a control circuit driven by said DC power supply voltage, said control circuit having:
a first mode in which said first switch is brought out of conduction, said second switch is brought into conduction, and said converter and said inverter are operated to supply said second AC electric power to said load;
a second mode in which said first switch is brought out of conduction, said second switch is brought into conduction, operation of said converter is stopped, and said inverter is operated to supply said second AC electric power to said load;
a third mode in which said first and second switches are brought out of conduction to stop electric power supply to said load, and the operation of said converter is stopped and said inverter is operated to supply said second AC electric power to said DC power supply; and
a fourth mode in which said first switch is brought into conduction and said second switch is brought out of conduction to supply said first AC electric power to said load,
said control circuit
executing said first mode in a normal state in which said first AC electric power is supplied from said commercial AC power supply;
executing said second mode at the time of power failure in which supply of said first AC electric power from said commercial AC power supply is stopped;
executing said third mode at the time of discharge end in which an output voltage of said power storage device decreases to a predetermined voltage during said power failure; and
executing said fourth mode, and thereafter, executing said first mode when supply of said first AC electric power from said commercial AC power supply is resumed at the time of said discharge end.

2. The uninterruptible power supply apparatus according to claim 1, wherein
said control circuit
further has a fifth mode in which said first and second switches are brought into conduction, and said converter and said inverter are operated to supply said first and second AC electric power to said load, and
sequentially executes said fourth mode, said fifth mode and said first mode when supply of said first AC electric power from said commercial AC power supply is resumed at the time of said discharge end.

3. The uninterruptible power supply apparatus according to claim 1, further comprising
a third switch having one terminal receiving said first AC electric power and the other terminal connected to an input node of said converter, wherein
said control circuit brings said third switch into conduction in said first mode, and brings said third switch out of conduction in said second and third modes.

4. The uninterruptible power supply apparatus according to claim 1, further comprising a chopper selectively performing any of a first operation for stepping down an output voltage of said converter and providing the voltage to said power storage device, a second operation for stepping up the output voltage of said power storage device and providing the voltage to said inverter, and a third operation for causing a positive current to flow from said power storage device to said inverter, wherein said control circuit causes said chopper to perform said first operation in said first mode, causes said chopper to perform said second operation in said second mode, and causes said chopper to perform said third operation in said third mode.

5. The uninterruptible power supply apparatus according to claim 4, wherein said chopper includes:

a capacitor connected between a positive-side power supply node and a negative-side power supply node of said inverter;

first and second switching elements serially connected between the positive-side power supply node and the negative-side power supply node of said inverter;

first and second diodes connected in antiparallel with said first and second switching elements, respectively;

a first inductor connected between an anode of said first diode and a positive electrode of said power storage device;

a second inductor connected between an anode of said second diode and a negative electrode of said power storage device; and a third diode connected between the positive electrode of said power storage device and the positive-side power supply node of said inverter, in said first operation, said second switching element is fixed to a non-conduction state and said first switching element is brought into/out of conduction, in said second operation, said first switching element is fixed to the non-conduction state and said second switching element is brought into/out of conduction, and in said third operation, said first and second switching elements are fixed to the non-conduction state.

6. The uninterruptible power supply apparatus according to claim 4, wherein said chopper includes:

a first capacitor connected between a positive-side power supply node of said inverter and an intermediate node;

a second capacitor connected between said intermediate node and a negative-side power supply node of said inverter;

first and second switching elements serially connected between the positive-side power supply node of said inverter and said intermediate node;

third and fourth switching elements serially connected between said intermediate node and the negative-side power supply node of said inverter;

a first diode, a second diode, a third diode, and a fourth diode connected in antiparallel with said first to fourth switching elements, respectively;

a first inductor connected between an anode of said first diode and a positive electrode of said power storage device; and a second inductor connected between an anode of said third diode and a negative electrode of said power storage device, in said first operation, said second and third switching elements are fixed to a non-conduction state, and said first and fourth switching elements are alternately brought into conduction, in said second operation, said first and fourth switching elements are fixed to the non-conduction state, and said second and third switching elements are alternately brought into conduction, and in said third operation, said first to fourth switching elements are fixed to the non-conduction state.

* * * * *